(12) United States Patent
Byers

(10) Patent No.: US 7,243,614 B1
(45) Date of Patent: Jul. 17, 2007

(54) MODULAR ANIMAL ENCLOSURE

(76) Inventor: Thomas L. Byers, 5840 Stewart Dr., Mustang, OK (US) 73064

( * ) Notice: Subject to any disclaimer, the term of this patent is extended or adjusted under 35 U.S.C. 154(b) by 172 days.

(21) Appl. No.: 10/664,259

(22) Filed: Sep. 17, 2003

(51) Int. Cl.
*A01K 1/02* (2006.01)
*B65D 43/14* (2006.01)

(52) U.S. Cl. .................. 119/482; 119/500; 119/416; 119/448; 119/492; 119/499; 119/493; 119/474; 220/4.34; 220/810; 220/817; 220/848

(58) Field of Classification Search .............. 119/500, 119/436, 416, 418, 448, 453, 454, 474, 482, 119/492, 496–499, 300–320, 484–486, 309, 119/493; D30/108; 454/242, 250, 83, 173, 454/275, 364, 365, 367, 368; 220/4.34, 810, 220/817, 831, 832, 833, 848; 165/48.1, 254, 165/53, 59; 52/198
See application file for complete search history.

(56) References Cited

U.S. PATENT DOCUMENTS

| | | | | |
|---|---|---|---|---|
| 411,739 | A * | 9/1889 | Thayer | 47/73 |
| 943,825 | A * | 12/1909 | Hardinge | 222/153.01 |
| 1,032,012 | A * | 7/1912 | Martin | 52/82 |
| 1,198,524 | A * | 9/1916 | Cunliffe | 220/6 |
| 2,183,472 | A * | 12/1939 | Brinton | 119/309 |
| 2,280,779 | A * | 4/1942 | Barragy | 119/482 |
| 2,342,211 | A * | 2/1944 | Newton | 165/236 |
| 2,359,716 | A * | 10/1944 | MacKenzie | 454/368 |
| 2,625,094 | A * | 1/1953 | Bonforte | 454/365 |
| 2,689,906 | A * | 9/1954 | Corbett | 392/347 |
| 2,732,826 | A * | 1/1956 | Dawson | 119/482 |
| 2,732,972 | A * | 1/1956 | Anschicks | 220/88.1 |
| 2,919,045 | A * | 12/1959 | Waugh et al. | 220/4.34 |
| 3,048,147 | A * | 8/1962 | McKean | 119/496 |
| 3,068,341 | A * | 12/1962 | Ortiz et al. | 219/220 |
| 3,160,139 | A * | 12/1964 | Wales, Jr. | 119/499 |
| 3,223,018 | A * | 12/1965 | Tucker | 454/186 |
| 3,389,687 | A * | 6/1968 | Trussell | 119/448 |
| 3,481,263 | A * | 12/1969 | Belden | 454/365 |
| D218,902 | S | 10/1970 | Kelley | |
| 3,710,761 | A * | 1/1973 | Gregory | 119/496 |
| 3,962,993 | A | 6/1976 | Dattilo | |
| 3,982,500 | A | 9/1976 | Marlatt | |

(Continued)

FOREIGN PATENT DOCUMENTS

FR      2553384 A1 *    4/1985

(Continued)

*Primary Examiner*—Andrea M. Valenti
(74) *Attorney, Agent, or Firm*—Fellers, Snider, et al.

(57) ABSTRACT

A modular animal enclosure includes a housing comprising a top portion affixed to a base portion to form a sheltered interior. The housing includes a door aperture and a climate conditioning aperture. A removeably attachable climate conditioning unit is installed over the climate conditioning aperture to facilitate a flow of atmospheric air from the exterior environment into the interior of the housing. The climate conditioning unit can variously comprise a cover assembly, a heating unit, a cooling unit and a forced air unit, and different types of units can be installed at different times. In another aspect, the bottom portion can be selectively hinged to the top portion on opposing sides of the housing to allow pivotal movement of the top portion in two opposite directions, as desired to permit access to the interior of the housing for inspection, maintenance and cleaning of the interior.

7 Claims, 11 Drawing Sheets

U.S. PATENT DOCUMENTS

| | | | |
|---|---|---|---|
| 4,006,713 A | 2/1977 | Hawley, III | |
| 4,021,975 A | 5/1977 | Calkins | |
| 4,104,988 A | 8/1978 | Trutor | |
| 4,109,427 A | 8/1978 | O'Brian et al. | |
| 4,195,593 A | 4/1980 | Dunn | |
| D257,493 S | 11/1980 | Lodrick | |
| 4,291,645 A | 9/1981 | Cruchelow et al. | |
| 4,367,695 A | 1/1983 | Lance | |
| 4,443,387 A * | 4/1984 | Gordon | 261/30 |
| 4,603,658 A | 8/1986 | Garnsey | |
| D288,733 S | 3/1987 | Welker | |
| 4,802,443 A | 2/1989 | Denmark | |
| 4,827,872 A | 5/1989 | Sommers | |
| 5,003,923 A | 4/1991 | Morgan | |
| D317,665 S | 6/1991 | Marshall | |
| 5,081,956 A | 1/1992 | Greitzer et al. | |
| D327,143 S | 6/1992 | Dickinson | |
| 5,121,710 A | 6/1992 | Gonzalez | |
| 5,193,483 A * | 3/1993 | Crider et al. | 119/448 |
| D334,634 S | 4/1993 | Greitzer | |
| 5,216,977 A | 6/1993 | Allen, Jr. | |
| 5,220,883 A | 6/1993 | Long | |
| 5,257,721 A * | 11/1993 | Smith et al. | 220/533 |
| D349,980 S | 8/1994 | Northrop et al. | |
| 5,383,313 A | 1/1995 | Deeke et al. | |
| 5,400,743 A | 3/1995 | Buckley | |
| 5,448,965 A | 9/1995 | McClure | |
| 5,465,686 A | 11/1995 | Monetti et al. | |
| 5,485,805 A | 1/1996 | Meissner | |
| 5,551,371 A * | 9/1996 | Markey et al. | 119/499 |
| 5,575,239 A * | 11/1996 | Bradburn et al. | 119/500 |
| 5,634,434 A | 6/1997 | Gibbons et al. | |
| 5,727,501 A | 3/1998 | York | |
| 5,746,271 A | 5/1998 | DeCosta | |
| 5,755,181 A * | 5/1998 | Petkovski | 119/163 |
| 5,791,293 A | 8/1998 | Northrop et al. | |
| 5,809,936 A * | 9/1998 | Wall | 119/484 |
| 5,868,101 A * | 2/1999 | Marshall | 119/428 |
| 5,887,436 A * | 3/1999 | Duddleston | 62/3.62 |
| 5,975,025 A * | 11/1999 | Kangas et al. | 119/484 |
| 6,014,949 A | 1/2000 | Ball | |
| 6,234,116 B1 | 5/2001 | Havener | |
| 6,318,294 B1 | 11/2001 | Richmond et al. | |
| 6,341,579 B1 * | 1/2002 | Alkire et al. | 119/165 |
| 6,403,922 B1 * | 6/2002 | Hawks et al. | 219/385 |
| 6,490,995 B2 * | 12/2002 | Greene, Jr. | 119/496 |
| 6,637,374 B2 * | 10/2003 | Hawks et al. | 119/448 |
| 2002/0185082 A1 | 12/2002 | Saxe et al. | |

FOREIGN PATENT DOCUMENTS

| | | | |
|---|---|---|---|
| GB | 2144317 A * | 3/1985 | |
| JP | 59044537 A * | 3/1984 | |
| JP | 07-048909 A * | 2/1995 | |
| JP | 10096315 A * | 9/1996 | |

* cited by examiner

MODULAR ANIMAL ENCLOSURE

FIELD OF THE INVENTION

The claimed invention relates generally to the field of animal enclosures and more particularly, but without limitation, to indoor and outdoor enclosures that can be used to provide shelter for domesticated animals such as dogs and cats.

BACKGROUND

It is often desirable to provide a domesticated animal (e.g., a dog, cat, etc.) with a suitable enclosure in which the animal can sleep, rest or retreat. Such an enclosure can be provided indoors within a family dwelling, or outdoors in a yard in which the animal can play.

Such enclosures should ideally provide adequate ventilation and, for enclosures located outdoors, shelter from the elements. Conscientious owners further tend to routinely inspect the interiors of such enclosures from time to time for maintenance and cleaning purposes.

While a number of animal enclosure designs have been proposed, there remains a continual need for improvements in the art that meet these and other requirements in an effective and efficient manner. It is to such improvements that the present invention is directed.

SUMMARY OF THE INVENTION

In accordance with preferred embodiments, a modular animal enclosure is provided suitable for use indoors or outdoors to provide shelter for a domesticated animal, such as but not limited to a cat or a dog.

The enclosure is formed of a housing comprising a base portion and a top portion which is affixed to the base portion to form a sheltered interior. The housing includes a door aperture to permit ingress of an animal into said interior and a climate conditioning aperture to accommodate a flow of atmospheric air between the interior and an external environment.

A climate conditioning unit is configured for removeable attachment to the housing adjacent the climate conditioning aperture. The climate conditioning unit is contactingly supported by the housing at a position a selected distance away from the climate conditioning aperture so as to form a gap therebetween. The climate conditioning unit facilitates the flow of atmospheric air through the gap and through the climate conditioning aperture to the interior.

In one aspect, the climate conditioning unit comprises a cover assembly comprising a plate member having a cross-sectional area greater than the cross-sectional area of the climate conditioning aperture. The plate member is supported by the housing at first and second locations on opposing sides of the climate conditioning aperture.

Preferably, first and second posts project from the plate member and into corresponding first and second apertures in the housing at said first and second locations to secure the cover assembly to the housing. An insertion depth of the first and second posts into the respective first and second apertures can be slidingly adjusted to alter a cross-sectional thickness of the gap between the cover assembly and the top cover.

In another aspect, the climate conditioning unit comprises a cooled air unit which supplies cooled air to the interior. In another aspect, the climate conditioning unit comprises a fan unit which directs increased velocity ambient air downwardly into the interior. In yet another aspect, the climate conditioning unit comprises a heating unit which supplies heated air to the interior. In yet another aspect, the climate conditioning unit comprises a radiant heat source which directs radiant heat into the interior.

In accordance with further preferred embodiments, the modular animal enclosure comprises a base portion and a top portion attached to the base portion to form a housing with a sheltered interior and a door aperture to permit ingress of an animal into said interior.

The top portion is configured to be hinged to the base portion to facilitate access to the interior by pivotal movement of the top portion with respect to the base portion in a first direction by at least one hinge pin which projects through respective first hinge apertures in the base portion and in the top portion, respectively, on a first side of the housing.

The base portion and top portion further comprise respective second hinge apertures on a second side of the housing opposite the first side so that the hinge pin can be alternately inserted through the second hinge apertures to facilitate access to the interior by pivotal movement of the top portion with respect to the base portion in a second direction.

These and various other features and advantages which characterize the claimed invention will become apparent upon reading the following detailed description and upon reviewing the associated drawings.

DETAILED DESCRIPTION

Figure 1:
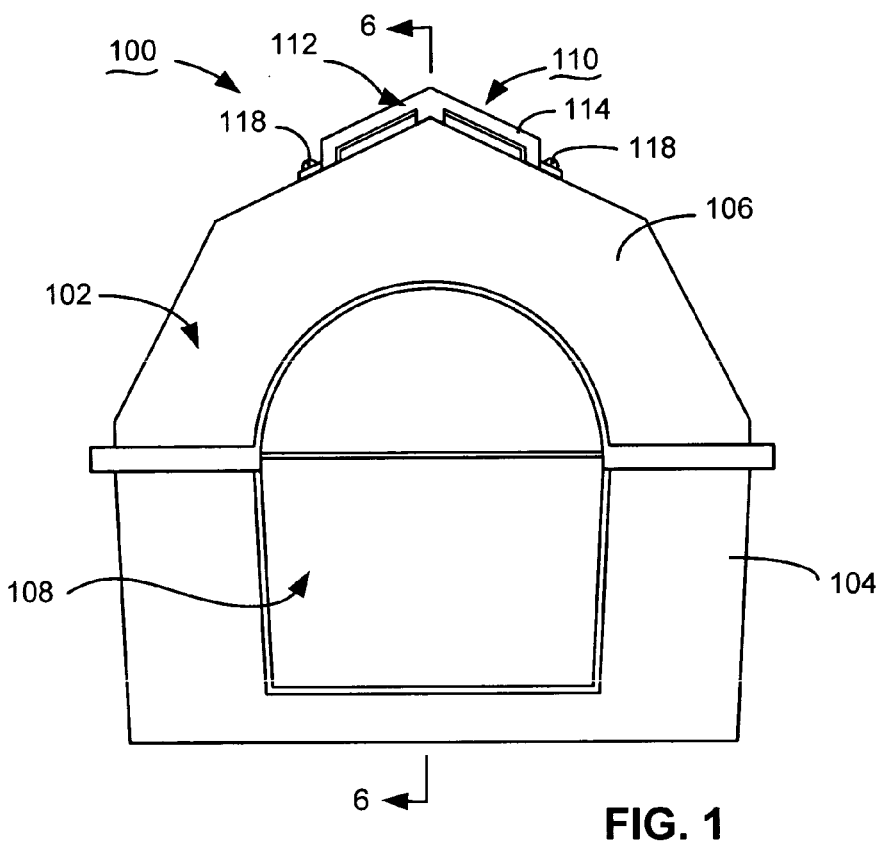
FIG. 1 is a front elevational view of an animal enclosure constructed in accordance with preferred embodiments of the present invention.

FIG. 1 provides a front elevational view of a modular animal enclosure 100 constructed in accordance with preferred embodiments of the present invention.

The enclosure includes a housing 102 which provides a domesticated animal (such as a dog or cat) with a sheltered interior. The housing 102 is preferably formed of a rigid, durable material such as injection molded plastic. The housing 102 is formed of a base portion 104 and a removable attachable top portion 106 which is affixed to the base portion 104. Preferably, the top portion 106 is sized to be inverted and slipped into the base portion 104 (or vice versa) to conserve space during shipping and storage.

The housing 102 includes a door aperture 108 to permit ingress of the animal into the interior. Although not visible in FIG. 1, it will be understood that the housing 102 further includes a climate conditioning aperture, preferably located in the top portion 106, to accommodate a flow of atmospheric air between the interior and an external environment.

A climate conditioning unit 110 is secured to the housing 102 adjacent the climate conditioning aperture. Various embodiments of the climate conditioning unit 110 will be discussed shortly. However, it will be noted at this point that the climate conditioning unit 110 is configured for removable attachment to the housing and, when installed, facilitates the flow of atmospheric air between the interior and exterior environments through a gap between the unit 110 and the housing 102 and through the climate conditioning aperture.

Figure 2:
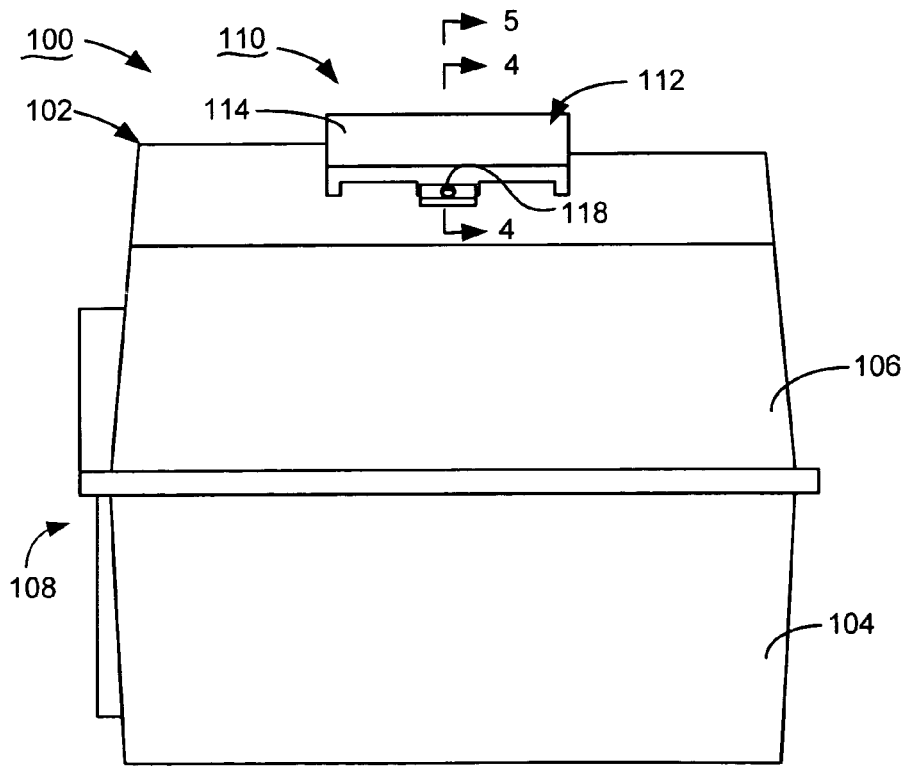
FIG. 2 is a side elevational view of the enclosure of FIG. 1.
Figure 3:
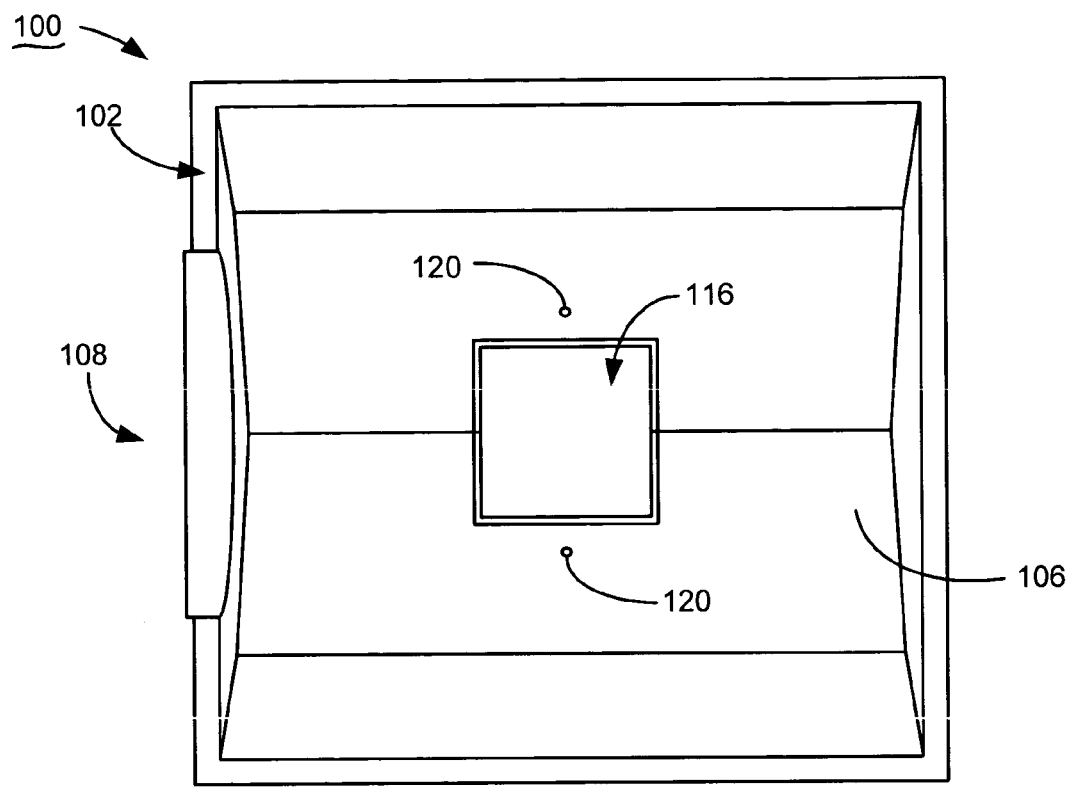
FIG. 3 is a top plan view of the enclosure to depict a climate conditioning aperture formed in a housing of the enclosure.
Figure 4:
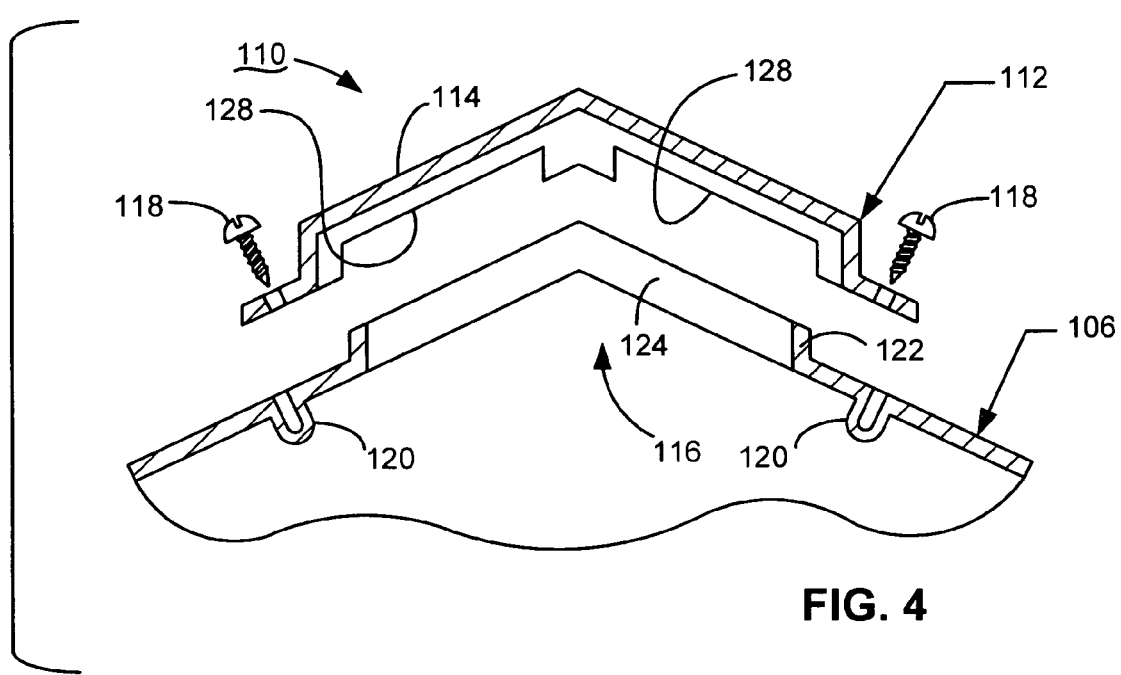
FIG. 4 is a cross-sectional, exploded view of relevant portions of the enclosure depicted along line 4—4 in FIG. 3 to illustrate a preferred manner in which a climate conditioning unit (comprising a cover assembly) is affixed adjacent the climate conditioning aperture of FIG. 3.

The unit 110 as depicted in FIGS. 1 and 2 preferably comprise a cover assembly 112 which includes a plate member 114 that extends adjacent, and covers, the climate conditioning aperture (depicted at 116 in FIG. 3). The plate member 114 is affixed to the housing 102 via fasteners 118 which extend into corresponding apertures 120 in the housing at locations adjacent, and beyond, the aperture 116, as shown in FIG. 4. The climate conditioning aperture 116 is preferably defined by an upwardly extending flange 122 in the top portion material which provides the aperture 116 with a substantially vertically extending interior sidewall 124. The sidewall helps to prevent rain and the like from entering the climate conditioning aperture when the conditioning unit is attached.

The climate conditioning aperture 116 is preferably rectangular in cross-sectional shape, as shown in FIG. 3, although such is not limiting. Moreover, the aperture 116 is preferably relatively large (e.g., at least four inches across) to permit adequate air flow and clearance for different embodiments of the climate conditioning unit 110.

Figure 5:
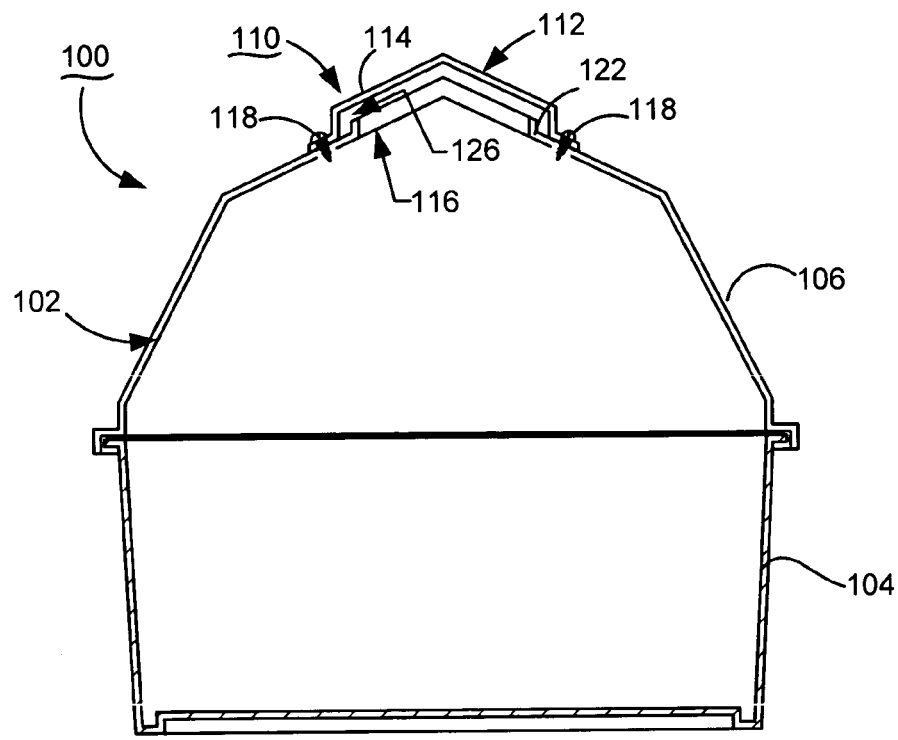
FIG. 5 provides a cross-sectional representation of the enclosure as depicted along line 5—5 in FIG. 2.
Figure 6:
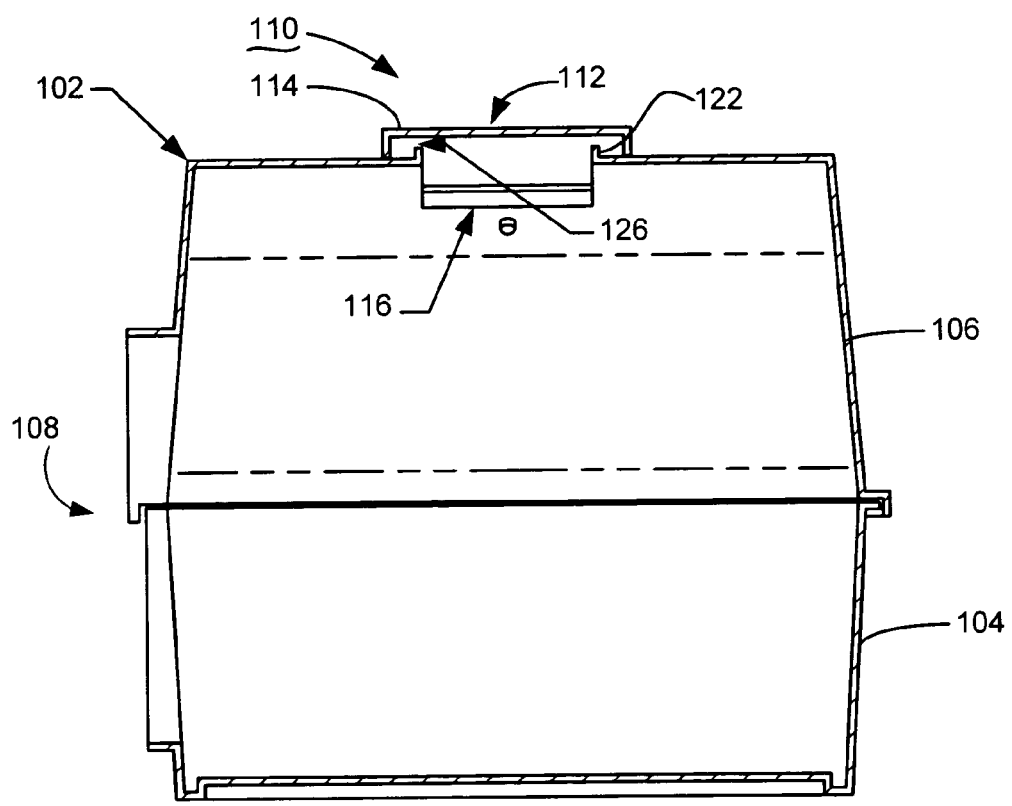
FIG. 6 provides a cross-sectional representation of the enclosure as depicted along line 6—6 in FIG. 1.

FIG. 5 shows the cover assembly 112 in conjunction with the housing 102, as depicted along line 5—5 in FIG. 2. FIG. 6 shows this arrangement along line 6—6 in FIG. 1. The aforementioned gap between the housing 102 and the assembly 112 is denoted at 126. Notches 128 in the plate member 114 (best viewed in FIG. 4) permit air flow from the interior to the exterior environment (and vice-versa) through the aperture 116, over the upwardly extending flange 122 into the gap 126, and then through the notches 128.

Figure 7:
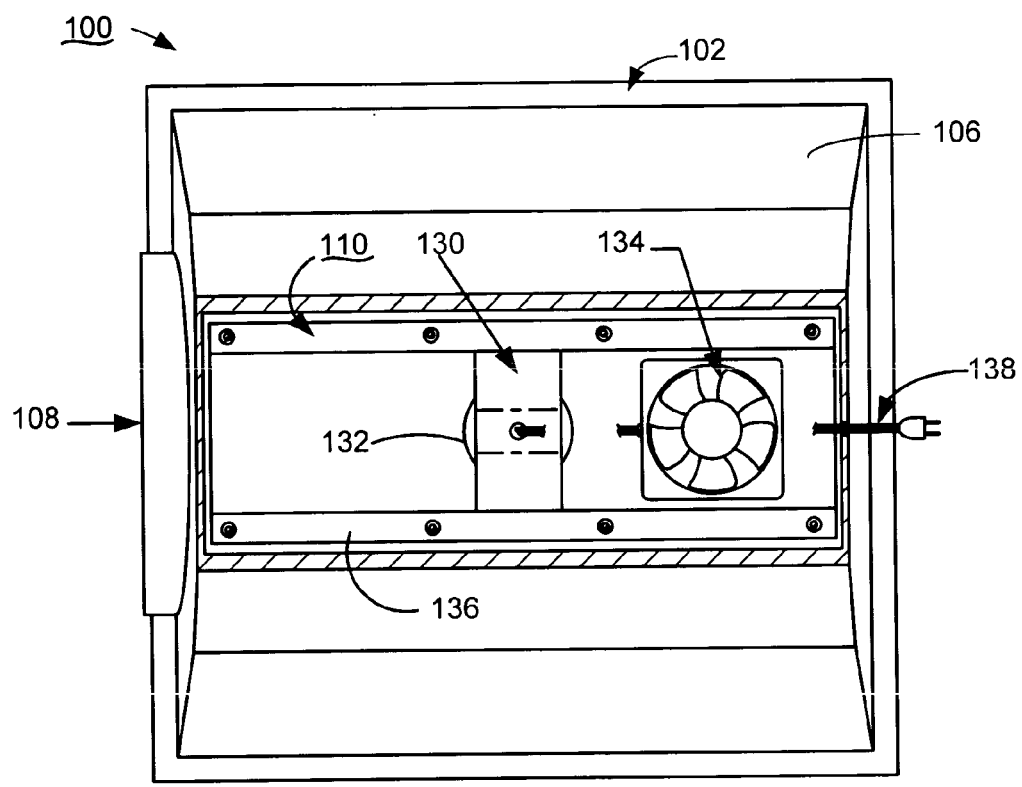
FIG. 7 is a top plan, partial cross-sectional view of the enclosure to illustrate the climate conditioning unit characterized as the cover assembly in conjunction with a heating assembly.
Figure 8:
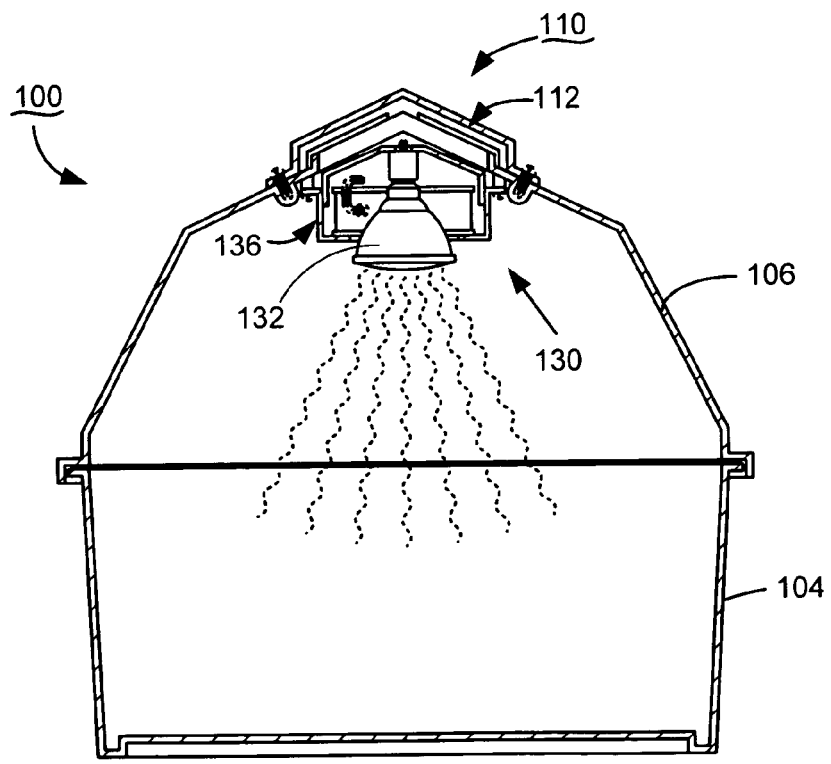
FIG. 8 provides a cross-sectional, elevational view of the embodiment of FIG. 7.
Figure 9:
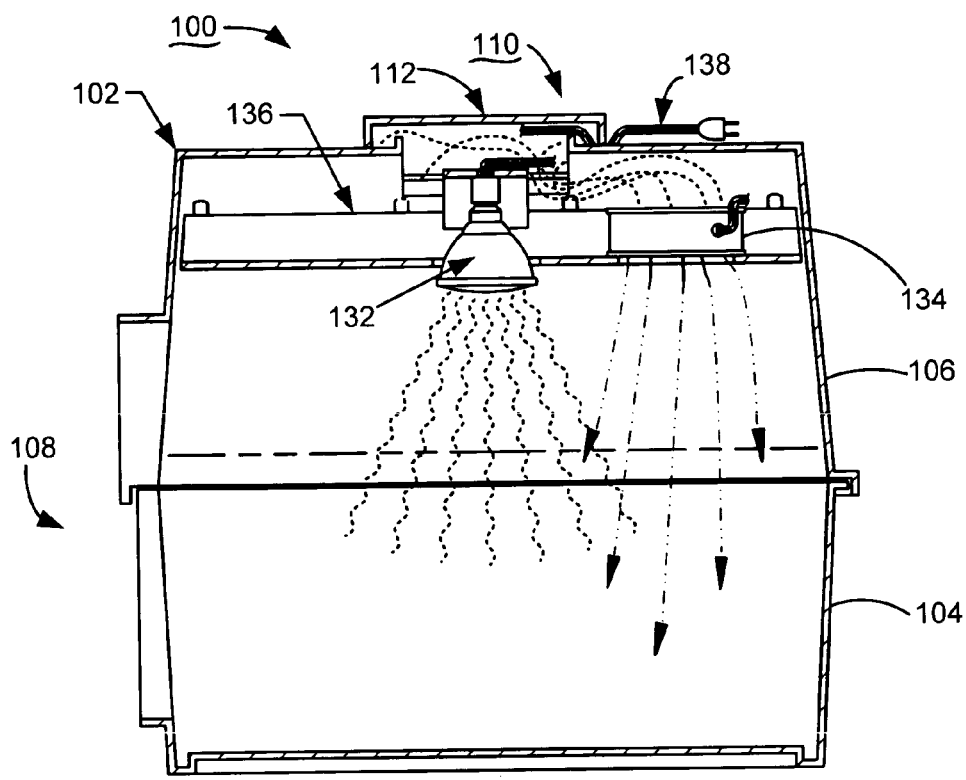
FIG. 9 provides another cross-sectional, elevational view of the embodiment of FIG. 7.

An alternative embodiment for the climate conditioning unit 110 is generally set forth by FIGS. 7–9, which illustrates the unit as comprising the aforedescribed cover assembly 112 in combination with an interior mounted heating assembly 130. The heating assembly 130 comprises a radiant heat source 132 (e.g., heat lamp) and an optional fan 134 which are respectively supported by interior bracket 136. Contrawise, the fan 134 can be used with or without the radiant heat source 132.

The heat source radiates heat into the interior of the housing 102, as depicted in FIGS. 8 and 9. As desired, the fan 134 further draws exterior air through the gap 126 and aperture 116 into the interior of the housing (either intermittently or continuously). Alternatively, the fan can be used to vent air from the interior to the exterior environment. Electrical power is supplied to the heat source 132 (and fan 134) via electrical cord 138. The cord 138 preferably projects out of the housing 102 toward the topmost portions of the housing to allow the cord to be routed away from reach of the animal.

Figure 10:
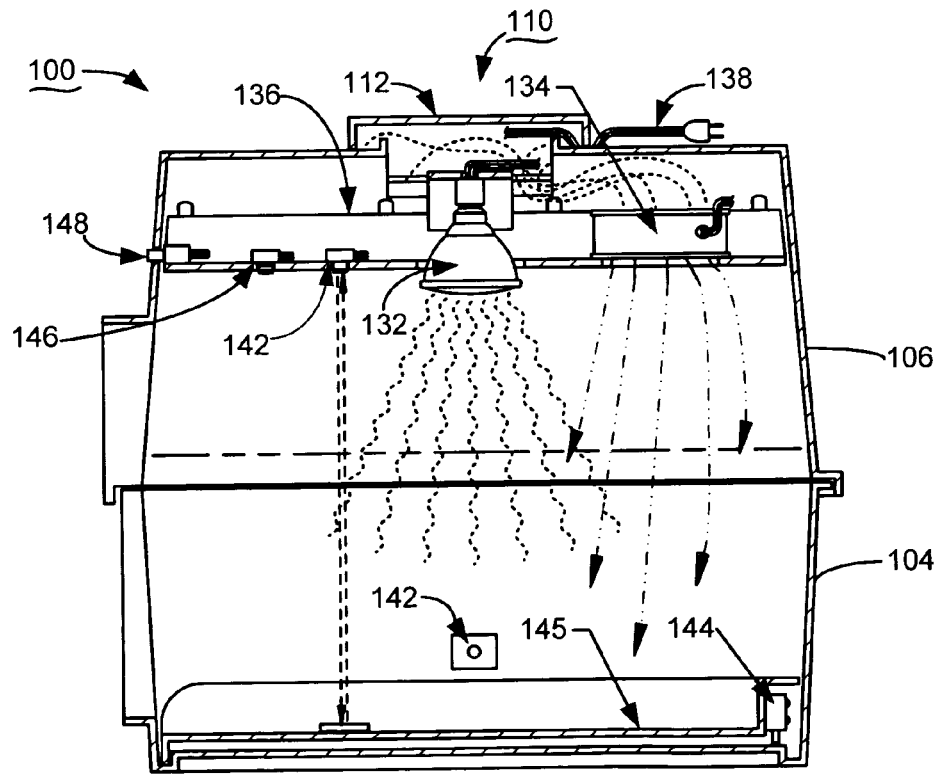
FIG. 10 is similar to the embodiment of FIG. 9, but includes the use of one or more sensors to detect the presence of an animal within the interior of the housing.
Figure 11:
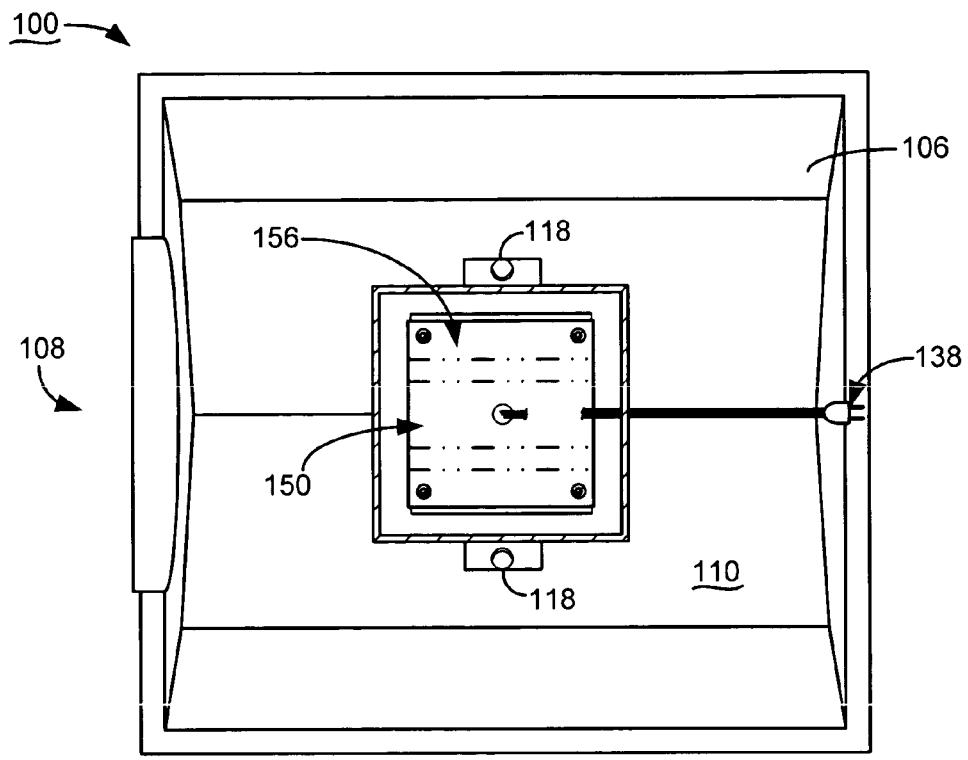
FIG. 11 is a partial cross-sectional, top plan view of the enclosure in accordance with another embodiment in which the climate conditioning unit comprises a heating assembly.
Figure 12:
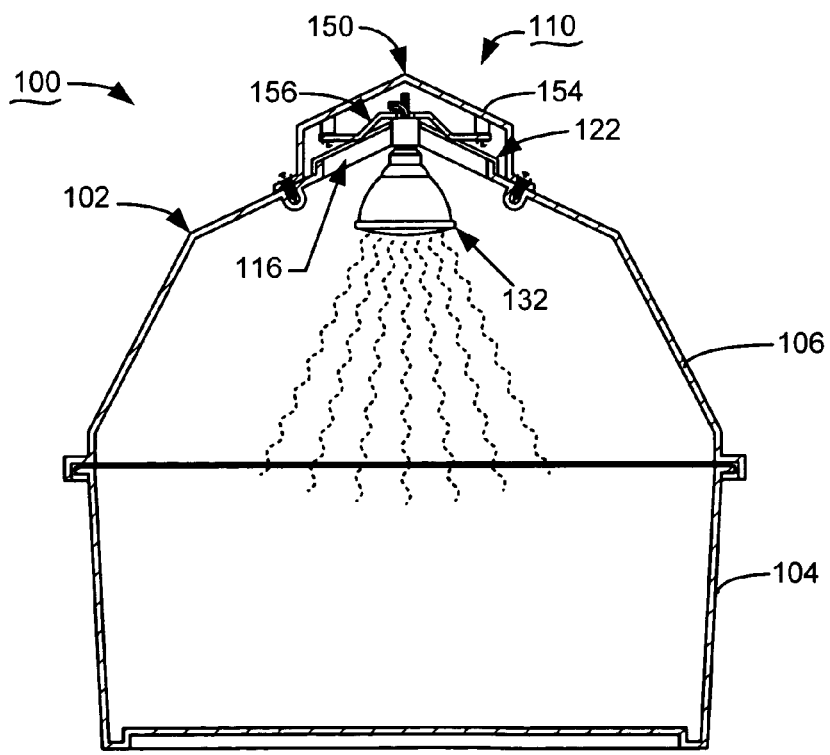
FIGS. 12–14 provide various cross-sectional, elevational views of the embodiment of FIG. 11.
Figure 13:
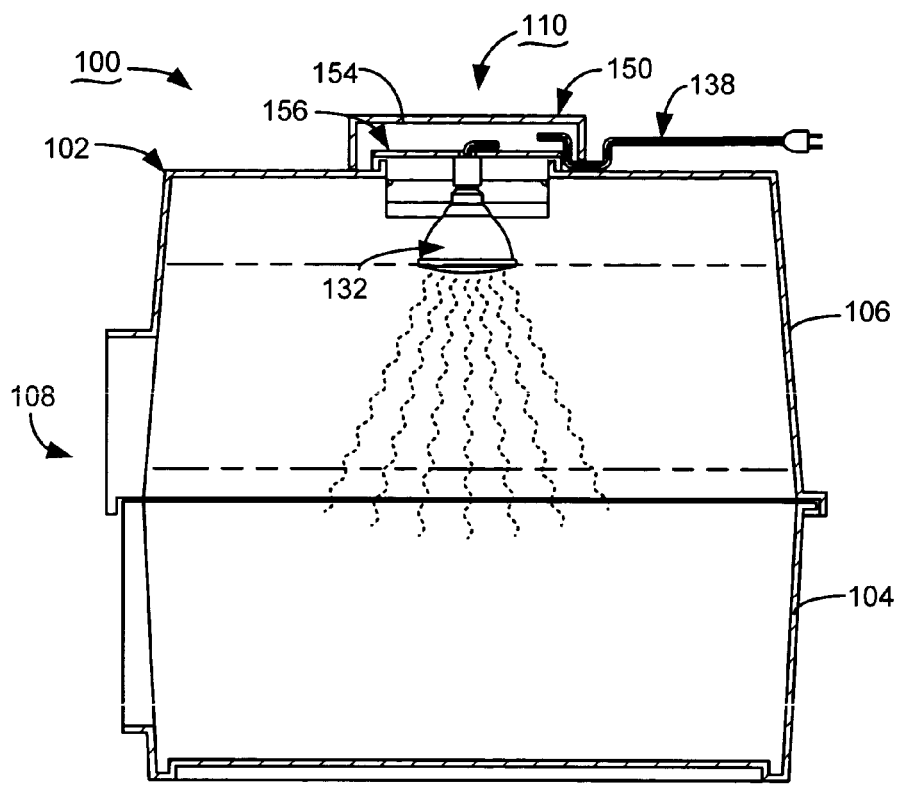
Figure 14:
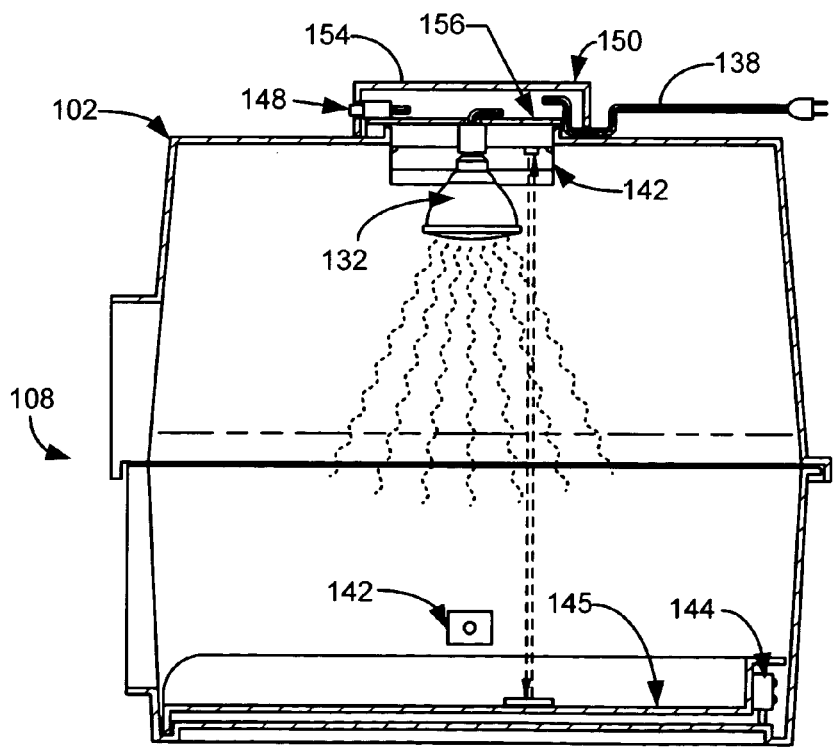

As desired, one or more proximity sensors (such as photoelectric sensors 142 and a pressure detector and pad combination 144, 145) can be incorporated into the unit 110 as depicted in FIG. 10 to detect the presence of the animal within the housing 102. The climate conditioning unit can be made operationally responsive to said sensors. In this way, for example, the housing 102 can be heated upon entry and occupancy of the interior of the housing by the animal.

Alternatively, or additionally, a thermostatic switch 146 can regulate the interior temperature by modulating operation of the heat source 132 and/or fan 134 in relation to the detected temperature of the interior. A photoelectric dusk-to-dawn sensor 148 can further be used to detect nightfall so as to further permit operation at night and inhibit operation during the day, etc. For outdoor applications, the heating assembly 130 can be installed during the colder months and removed during the warmer months, or simply left in place and not used during the warmer months, as desired.

FIGS. 11–14 provide another alternative embodiment for the climate conditioning unit 110. A heating assembly 150 is provided similar to that disclosed in FIGS. 7–10, except that the heating assembly 150 does not employ a separate cover assembly; rather, the entire unit is one assembly which mounts to the housing 102 as discussed above. The heat source 132 is mounted to a plate member 154 via bracket 156, with the plate member 154 forming a gap in atmospheric communication with the exterior environment, as discussed above.

As before, the heat source 132 directs radiant heat into the interior. One or more sensors (such as photoelectric sensors 142, pressure sensors/pad 144, 145 and dusk-to-dawn photoelectric sensors 148 in FIG. 14) can be used to modulate the operation of the heat source 132 as desired.

Figure 15:
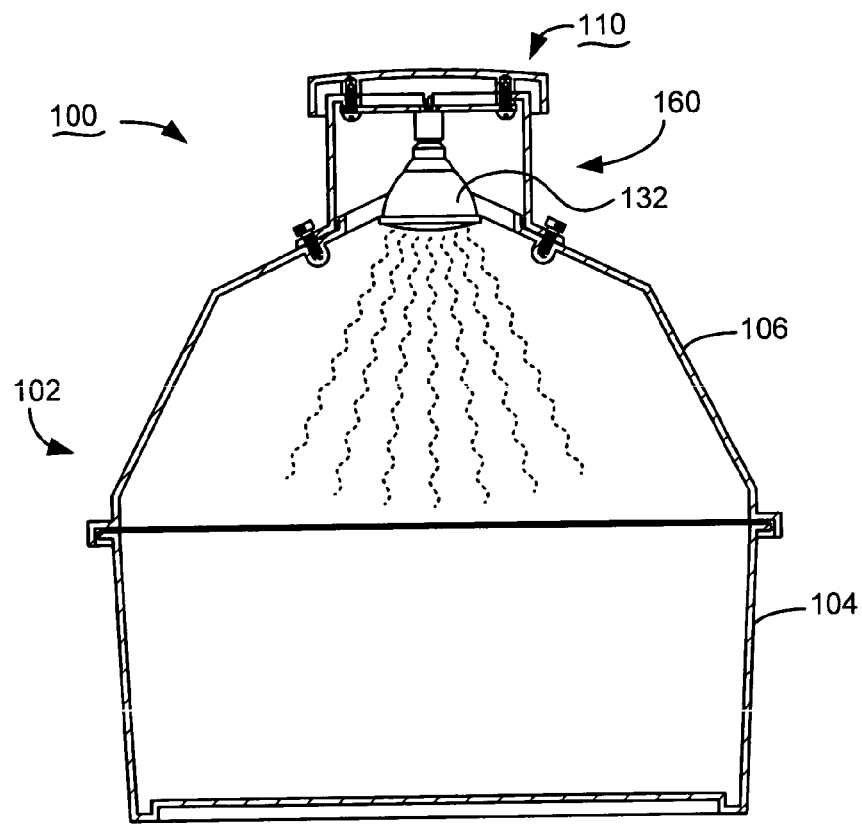
FIG. 15 provides yet another embodiment in which the climate conditioning unit comprises a recessed heating assembly.

FIG. 15 provides yet another alternative embodiment for the climate conditioning unit 110. In FIG. 15, a heating assembly 160 is provided with the heat source 132 recessed substantially above the interior. This embodiment provides additional "head-room" within the interior and lessens the chance that the animal will come into contact with the heat source 132, especially for relatively larger animals.

Figure 16:
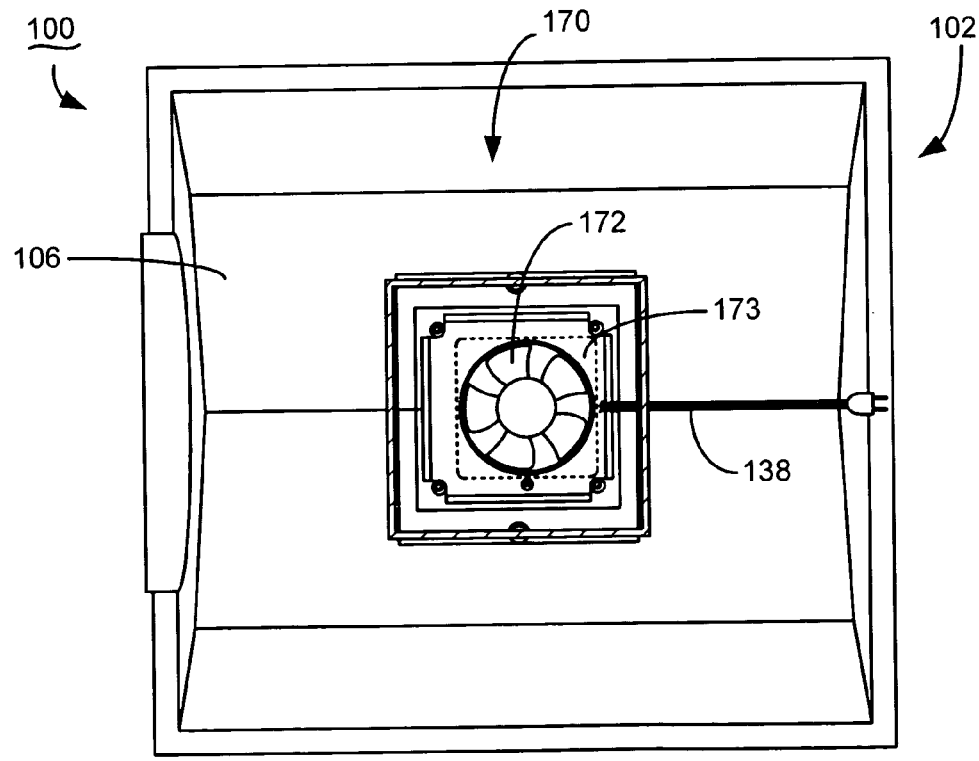
FIG. 16 is a partial cross-sectional, top plan view of the enclosure in accordance with another embodiment in which the climate conditioning unit comprises a forced cooling assembly.
Figure 17:
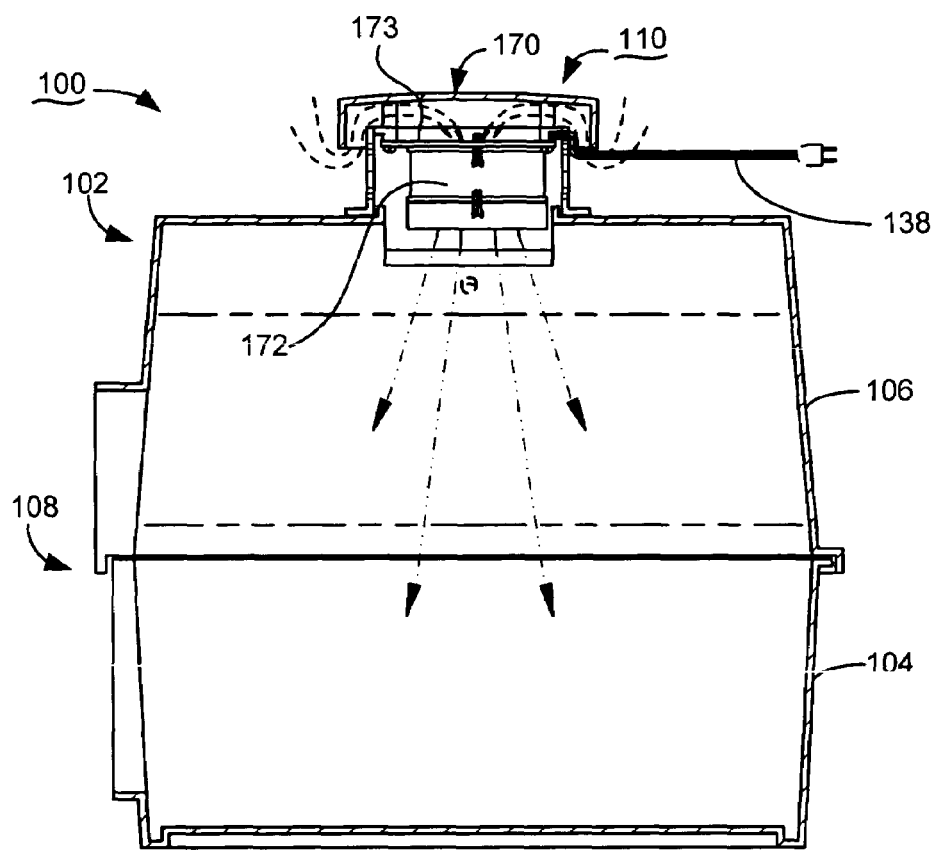
FIG. 17 provides a side elevational, cross-sectional view of FIG. 16.

FIGS. 16–17 show another embodiment in which the climate conditioning unit 110 comprises a cooling assembly 170. This embodiment employs a fan assembly 172 with an optional integrated cooling module 173 (such as a thermostatic cooler or similar unit). As with the embodiment of FIG. 15, the cooling assembly 170 is preferably recessed above the interior of the housing 102.

Figure 18:
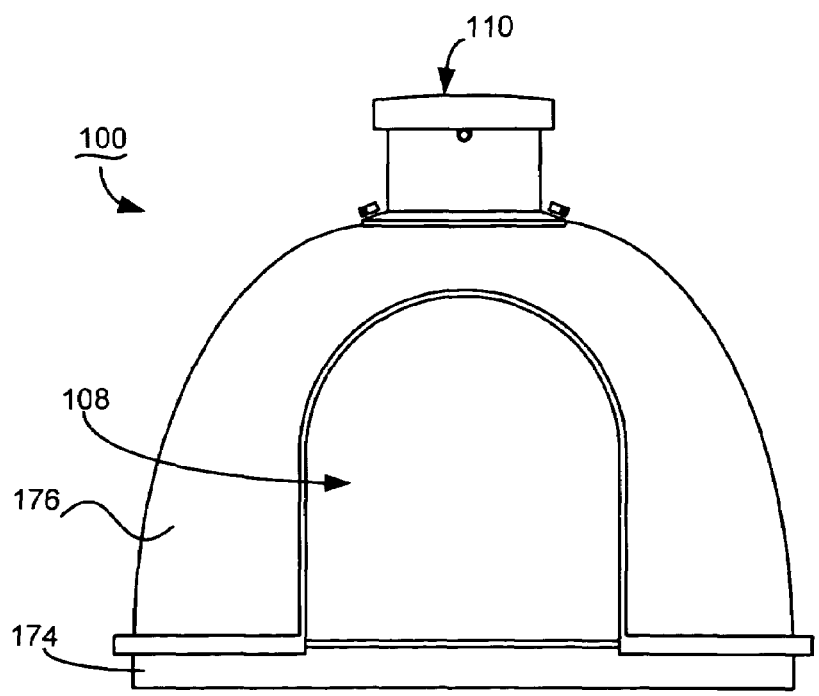
FIGS. 18 and 19 provide yet another embodiment in which the housing of the enclosure generally has an igloo shape.
Figure 19:
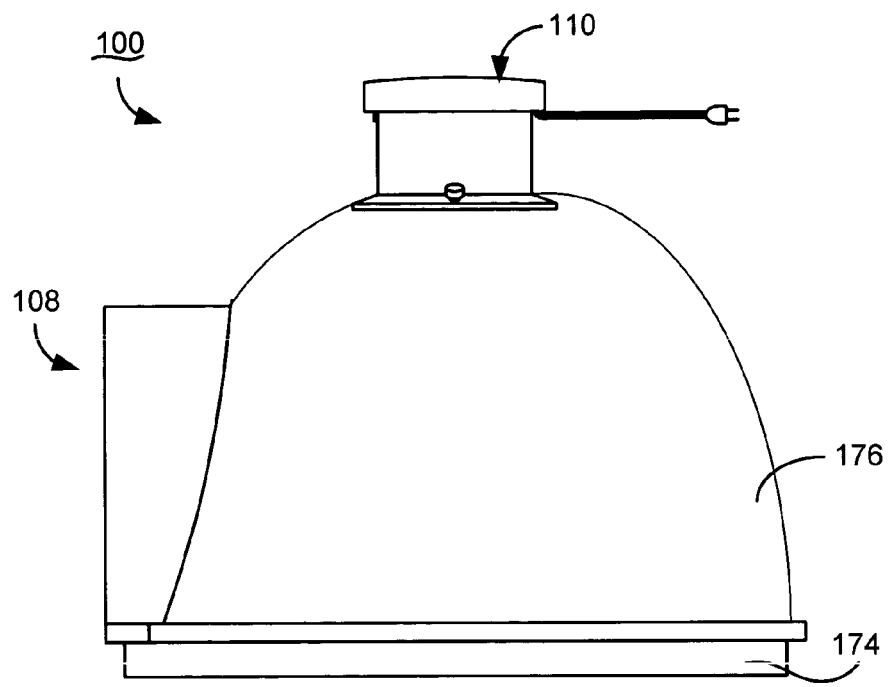

While preferred embodiments presented thus far have used a "barn-shaped" housing 102, it will be appreciated that such is not necessarily limiting to the scope of the claimed invention. Rather, other shapes such as an "igloo-shape" can be used for the housing 102, as depicted in FIGS. 18 and 19. These figures show the housing 102 to comprise a substantially planar base portion 174 and a substantially spherical shaped top portion 176 with a climate conditioning aperture (not shown). Any of the variously described climate conditioning units 110 can be used in conjunction with this embodiment.

Figure 20:
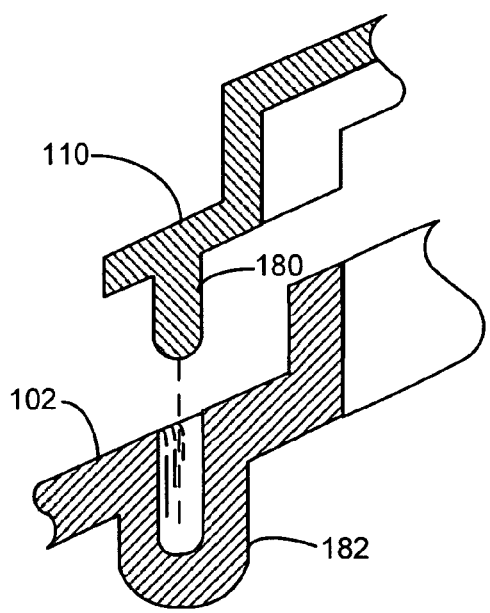
FIG. 20 illustrates an alternative embodiment of the enclosure in which a post extending from the climate conditioning unit is inserted into a closed cup-shaped recess formed in the housing to secure the climate conditioning unit to the housing.
Figure 21:
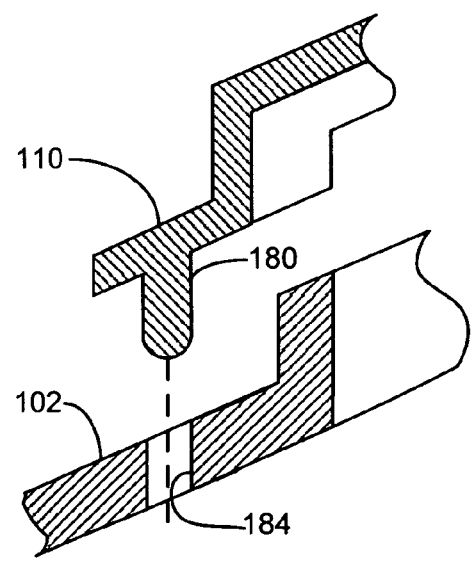
FIG. 21 provides another alternative embodiment in which the post is inserted into and through an aperture in the housing.

FIGS. 20 and 21 provide alternative methodologies for attachment of the climate conditioning unit 110 to the housing 102. In lieu of the aforementioned fasteners 118, rigid, vertically extending posts 180 can be formed in the plate member 114, 154 during the same process used to form the plate member. The posts 180 are inserted into either a closed, cup shaped recess 182 (FIG. 20) or through a post-receiving aperture 184 (FIG. 21).

In both embodiments, the post 180 and recess/aperture 182, 184 can be configured to permit full or partial insertion of the post 180, thereby allowing the cross-sectional thickness of the gap 126 to be adjusted while maintaining adequate attachment of the climate conditioning unit 110 to the housing 102.

As discussed above, the climate conditioning aperture 116 facilitates the flow of air between the interior of the housing 102 and the exterior environment. Another advantage of the aperture 116 is that, upon removal of the climate conditioning unit 110, an owner can readily inspect the interior of the enclosure to see if maintenance or cleaning is required. That is, the aperture 116 provides an additional vantage point in addition to the door aperture 108.

Figure 22:
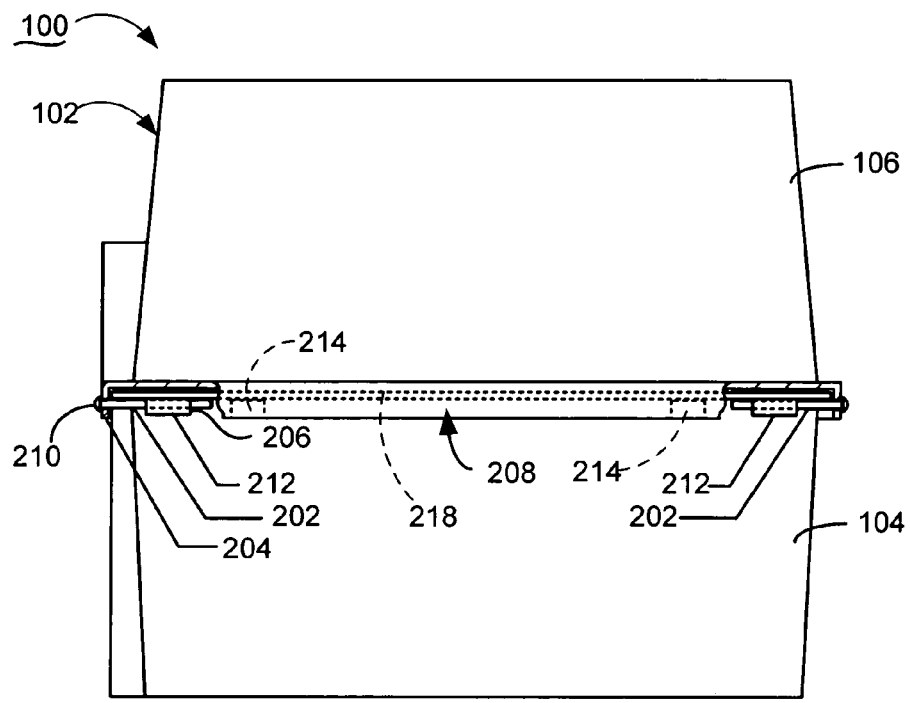
FIG. 22 illustrates yet another embodiment of the enclosure in which hinge pins are inserted into corresponding apertures in top and base portions of the housing to permit pivotal movement of the top portion with respect to the base portion.
Figure 23:
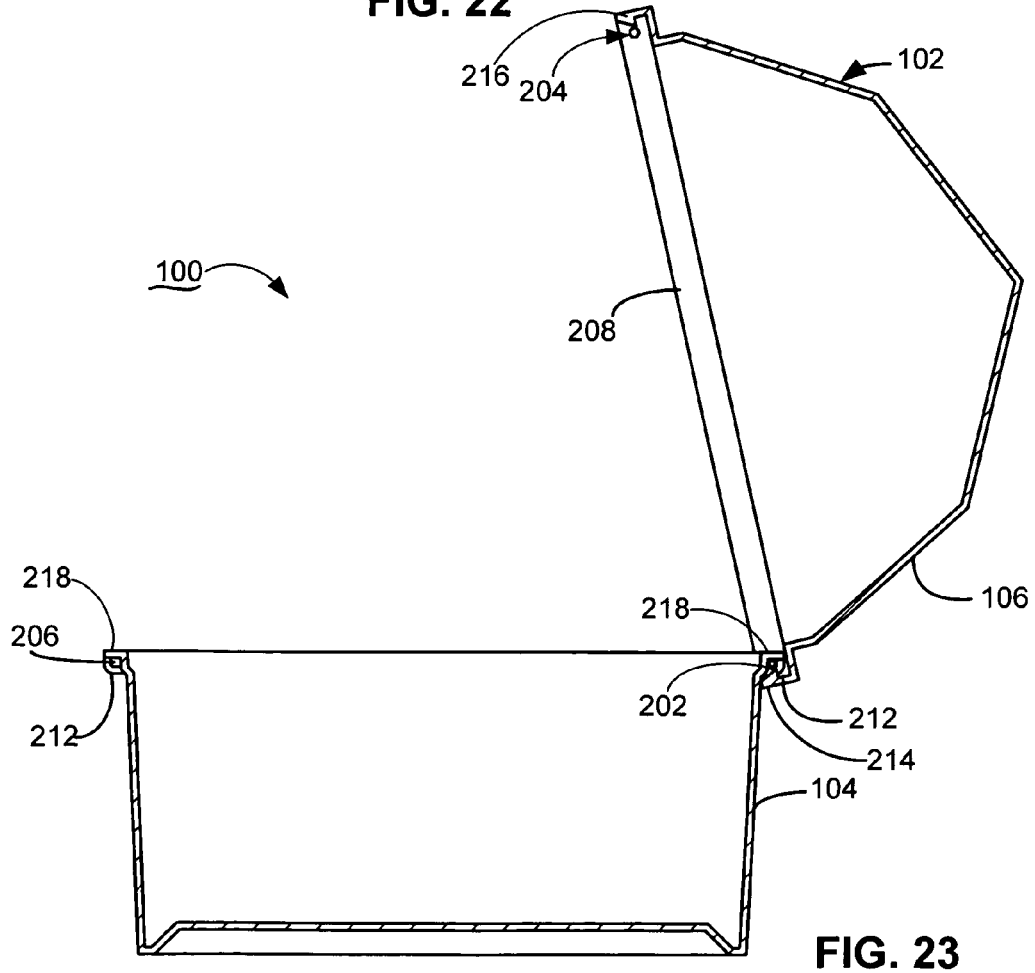
FIG. 23 illustrates the embodiment of FIG. 22 to show the housing in the open position, as well as to illustrate opposing apertures in which the pins can be alternatively inserted to permit opening from the opposite direction.

In accordance with further preferred embodiments, the top portion 106 of the housing 102 can be configured to be hinged to the base portion 104, as depicted in FIGS. 22 and 23. This permits further and complete access to the interior by pivotal movement of the top portion 106 with respect to the base portion.

This is preferably carried out by at least one rigid hinge pin 202 (two such pins are shown in FIG. 22). The hinge pin 202 is preferably inserted through corresponding apertures 204, 206 in the top portion 106 and base portion 104, respectively. The aperture 204 in the top portion 106 extends through a downwardly depending, circumferentially extending flange 208 in the top portion. A head 210 of the hinge pin 202 abuts this flange 208 as shown to prevent further insertion of the pin.

The aperture 206 in the base portion 104 extends through a journal flange 212 that protrudes from the base portion. Preferably, the apertures 204, 206 are provided on opposing sides of the housing 102, so that the pin(s) 202 can be installed on either side of the housing 102. This allows the owner to select which way the housing 102 can be opened, as one way may be more convenient than the other way depending on the placement of the enclosure. In other words, the pin(s) 202 in conjunction with the opposing sets of apertures 204, 206 on opposing sides of the housing 102 facilitate pivotal movement of the top portion 106 (and 176 in FIGS. 18, 19) with respect to the base portion 104 (and 174) in alternate, opposing first and second directions.

Preferably, the downwardly depending, circumferentially extending flange 208 of the top portion 106 supports a plurality of substantially triangularly shaped flange portions 214, 216 which extend upwardly as shown to a position below and adjacent to an outwardly extending hat flange 218 of the base portion 104. It can be seen that the flange portions 214, 216 operate as retention tabs with the hat flange 218 on respective sides of the housing 102 to form respective interference latches. More particularly, using FIG. 23 as an example, the flange portion 216 (on the left side of the drawing) cooperates with that portion of the flange 218 adjacent portion 216 to impede initiation of rotation of the top portion 106 to the open position shown in FIG. 23. At the same time, it can be seen that the flange portion 214 (on the side of the hinge pins 202) rotates down and away from that portion of the flange 218 adjacent portion 214 during such rotation. The same respective operation occurs when the hinge pins 202 are installed on the other side of the housing 102 from that shown in FIG. 23 (i.e., adjacent flange portion 216).

It will now be understood that the modular animal enclosure 100 provides several valuable advantages over the prior art. The climate conditioning aperture (in conjunction with the climate conditioning unit) generally tends to provide significantly improved ventilation air flow as compared to other designs. The climate conditioning aperture, as well as the hinged capabilities discussed above, provides ready access to the interior for maintenance purposes and the like. Moreover, the modular features of the climate conditioning unit result in the ability to install different units (i.e., a cover assembly, a cooling unit, a heating unit, etc.) as desired into the same enclosure.

It will now be understood that the present invention (as embodied herein and as claimed below) is generally directed to a modular animal enclosure (such as 100).

In accordance with preferred embodiments, the enclosure comprises a housing (such as 102) comprising a base portion (such as 104, 174) and a top portion (106, 176) which is affixed to the base portion to form a sheltered interior. The housing includes a door aperture (such as 108) to permit ingress of an animal into said interior and a climate conditioning aperture (such as 116) to accommodate a flow of atmospheric air between the interior and an external environment.

A climate conditioning unit (such as 110) is configured for removeable attachment to the housing adjacent the climate conditioning aperture. The climate conditioning unit is contactingly supported by the housing at a position a selected distance away from the climate conditioning aperture (such as at apertures 120) so as to form a gap (such as 126) therebetween. The climate conditioning unit facilitates the flow of atmospheric air through the gap and through the climate conditioning aperture to the interior.

In one aspect, the climate conditioning unit comprises a cover assembly (such as 112) comprising a plate member (such as 114) having a cross-sectional area greater than the cross-sectional area of the climate conditioning aperture, wherein the plate member is supported by the housing at first and second locations adjacent the climate conditioning aperture.

Preferably, first and second posts (such as 180) project from the plate member and into corresponding first and second apertures in the housing at said first and second locations to secure the cover assembly to the housing. An insertion depth of the first and second posts into the respective first and second apertures can be slidingly adjusted to alter a cross-sectional thickness of the gap between the cover assembly and the top cover.

In another aspect, the climate conditioning unit comprises a cooled air unit (such as 170) which supplies cooled air to the interior. In another aspect, the climate conditioning unit comprises a fan unit (such as 134) which directs increased velocity ambient air downwardly into the interior. In yet another aspect, the climate conditioning unit comprises a heating unit (such as 132) which supplies heated air to the interior.

In accordance with further preferred embodiments, the modular animal enclosure comprises a base portion (such as 104, 174) and a top portion (such as 106, 176) attached to the base portion to form a housing (such as 102) with a sheltered interior and a door aperture (such as 108) to permit ingress of an animal into said interior.

The top portion is configured to be hinged to the base portion to facilitate access to the interior by pivotal movement of the top portion with respect to the base portion in a first direction by at least one hinge pin (such as 202) which projects through respective first hinge apertures (such as 204, 206) in the base portion and in the top portion, respectively, on a first side of the housing.

The base portion and top portion further comprise respective second hinge apertures (such as 204, 206) on a second side of the housing opposite the first side so that the hinge pin can be alternately inserted through the second hinge apertures to facilitate access to the interior by pivotal movement of the top portion with respect to the base portion in a second direction.

For purposes of the appended claims, the recited "means for facilitating said flow of atmospheric air" will be understood to alternatively correspond to the disclosed cover assembly 112, the heating unit 132, the fan unit 134 and the cooled air unit 170, and the disclosed combinations thereof, all of which span and cover the climate conditioning aperture and are supported by at least one location adjacent to, and outside of, the climate conditioning aperture. Accordingly, this element will be construed to cover these structures and equivalents thereof. Other structures that rely upon the interior walls of the climate conditioning aperture to support said structures inhibit the flow of atmospheric air, are not covered by this element and are expressly excluded from the definition of an equivalent.

The recited "means for allowing pivotal movement" will be similarly understood to correspond to the disclosed at least one hinge pin 202 and the corresponding first hinge apertures 204, 206 and the second hinge apertures 204, 206 on opposing sides of the base portion 104, as shown in FIGS. 22 and 23.

The recited "means for sensing the presence of the animal within the interior" will be similarly understood to correspond to the disclosed photoelectric sensors 142 and pressure detector and pad combination 144, 145.

The recited "means for detecting an ambient condition" will be similarly understood to alternatively correspond to the thermostatic switch 146 which detects an ambient temperature of the interior, and to the photoelectric dusk-to-dawn sensor 148 which detects nightfall, and to a combination thereof.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the animal enclosure without departing from the spirit and scope of the present invention.

In addition, although the embodiments described herein are directed to an animal enclosure for domesticated animals, it will be appreciated by those skilled in the art that the enclosure can be used for various other types of applications without departing from the spirit and scope of the claimed invention.

What is claimed is:

1. A modular animal enclosure comprising a base portion and a top portion attached to the base portion to form a housing with a sheltered interior and a door aperture to permit ingress of an animal into said interior, wherein the top portion is configured to be hinged to the base portion to facilitate access to the interior by pivotal movement of the top portion with respect to the base portion in a first direction by at least one hinge pin which projects through respective first hinge apertures in the base portion and in the top portion on a first side of the housing, wherein the base portion and top portion further comprise respective second hinge apertures on a second side of the housing opposite the first side so that the hinge pin can be alternately inserted through the second hinge apertures to facilitate access to the interior by pivotal movement of the top portion with respect to the base portion in a second direction, and wherein the top portion and base portions each further comprise respective flanges which form first and second interference latches on the respective first and second sides of the housing so that the first interference latch impedes initiation of said rotation in the second direction and so that the second interference latch impedes initiation of said rotation in the first direction.

2. The animal enclosure of claim 1, wherein the top portion is sized to nest within the base portion when the top portion is inverted.

3. The animal enclosure of claim 1, further comprising a climate conditioning unit configured to be contactingly supported on the top portion to facilitate a flow of atmospheric air through a climate conditioning aperture in the top portion to the sheltered interior.

4. A modular animal enclosure comprising:
   a base portion comprising first and second pin apertures and first and second flange portions respectively adjacent the first and second pin apertures;
   a top portion configured to mate with the base portion to form a housing with a sheltered interior and a door aperture to permit ingress of an animal into said interior, the top portion comprising third and fourth pin aperture and third and fourth flange portions respectively adjacent the third and fourth pin apertures; and a hinge pin configured for insertion through the respective first and third apertures to facilitate rotational movement of the top portion with respect to the base portion in a first direction to facilitate access to the interior, the hinge pin further configured for alternative insertion through the respective second and fourth apertures to facilitate rotational movement of the top portion with respect to the base portion in a second direction opposite the first direction to facilitate access to the interior, wherein the second and fourth flange portions form an interference latch to impede initiation of said rotation in the first direction when the hinge pin is inserted through the first and third pin apertures, and wherein the first and third flange portions form an interference latch to impede initiation of said rotation in the second direction when the hinge pin is inserted through the second and fourth pin apertures.

5. The apparatus of claim 4, wherein the first and second flange portions extend outwardly in a direction away from the interior, and wherein the third and fourth flange portions are each characterized as a retention tab which extends inwardly in a direction toward the interior, each retention tab configured to extend below the respective first and second flange portion.

6. The apparatus of claim 4, wherein upon said rotational movement of the top portion with respect to the bottom portion in the first direction, the fourth flange portion rotates down and away in a clearing relation from the second flange portion so that said rotational movement of the top portion in the first direction is not impeded by said fourth flange portion, and wherein upon said rotational movement of the top portion with respect to the bottom portion in the second direction, the third portion rotates down and away in a clearing relation from the first flange portion so that said rotational movement of the top portion in the second direction is not impeded by said third flange portion.

7. The animal enclosure of claim 4, further comprising a climate conditioning unit configured to be contactingly supported on the top portion to facilitate a flow of atmospheric air through a climate conditioning aperture in the top portion to the sheltered interior.

* * * * *